(12) United States Patent
Chen et al.

(10) Patent No.: US 12,118,832 B1
(45) Date of Patent: Oct. 15, 2024

(54) METHOD AND SYSTEM FOR ANALYZING AND PREDICTING VEHICLE STAY BEHAVIOR BASED ON MULTI-TASK LEARNING

(71) Applicant: ZHEJIANG LAB, Zhejiang (CN)

(72) Inventors: Hongyang Chen, Hangzhou (CN); Chenxi Liu, Hangzhou (CN); Zhu Xiao, Changsha (CN)

(73) Assignee: ZHEJIANG LAB, Hangzhou (CN)

(*) Notice: Subject to any disclaimer, the term of this patent is extended or adjusted under 35 U.S.C. 154(b) by 0 days.

(21) Appl. No.: 18/492,767

(22) Filed: Oct. 23, 2023

Related U.S. Application Data

(63) Continuation of application No. PCT/CN2023/089134, filed on Apr. 19, 2023.

(51) Int. Cl.
*G07C 5/02* (2006.01)
(52) U.S. Cl.
CPC ..................... *G07C 5/02* (2013.01)
(58) Field of Classification Search
CPC ....................................................... G07C 5/02
See application file for complete search history.

(56) References Cited

U.S. PATENT DOCUMENTS

| | | | |
|---|---|---|---|
| 2004/0032342 A1* | 2/2004 | Dunning | G08G 1/14 340/932.2 |
| 2020/0160708 A1* | 5/2020 | Kamiya | G06V 20/53 |
| 2020/0164899 A1* | 5/2020 | Yasui | B60W 60/00253 |
| 2022/0163335 A1 | 5/2022 | Beaurepaire et al. | |
| 2023/0117496 A1* | 4/2023 | Hubschneider | G01C 21/3492 701/414 |

FOREIGN PATENT DOCUMENTS

| | | |
|---|---|---|
| CN | 111444243 A | 7/2020 |
| CN | 112529284 A | 3/2021 |
| CN | 113780665 A | 12/2021 |
| CN | 114398462 A | 4/2022 |

OTHER PUBLICATIONS

International Search Report (PCT/CN2023/089134); Date of Mailing: Jun. 21, 2023.
Study-of-forecasting-urban-private-car-vols. based-on-multi-source-heterogeneous-data-fusion.
Exploiting-Spatiotemporal-Correlations-of-Arrive-Stay-Leave-Behaviors-for-Private-Car-Flow-Prediction.

* cited by examiner

*Primary Examiner* — Behrang Badii
(74) *Attorney, Agent, or Firm* — W&G Law Group

(57) ABSTRACT

The present application discloses a method and a system for analyzing and predicting a vehicle stay behavior based on multi-task learning, and the method includes the following steps: acquiring vehicle GPS and OBD data including a vehicle ID, a travel start time, a start longitude, a start latitude, an end time, an end longitude, and an end latitude after desensitization; preprocessing vehicle GPS and OBD data to obtain vehicle stay behavior data including stay location and stay duration; extract a spatial-temporal characteristic of the preprocessed vehicle stay behavior data by a deep recurrent neural network; inputting the spatial-temporal characteristic into a multi-task learning and predicting network, and obtaining the correlation between a stay location prediction task and the stay duration prediction task based on the historical stay behavior of the vehicle through the multi-task learning and predicting network to predict the stay location and stay duration.

1 Claim, 5 Drawing Sheets

---

Acquiring vehicle GPS and OBD data including a vehicle ID, a travel start time, a start longitude, a start latitude, an end time, an end longitude, and an end latitude after desensitization of a vehicle

↓

Preprocessing the vehicle GPS and OBD data to obtain vehicle stay behavior data including stay locations and stay durations, extracting a spatial-temporal characteristic of the preprocessed vehicle stay behavior data by a deep recurrent neural network

↓

Inputting the spatial-temporal characteristic into a multi-task learning and predicting network, and obtaining a correlation between a stay location prediction task and a stay duration prediction task through the multi-task learning and predicting network based on historical stay behaviors of the vehicle to predict the stay locations and the stay durations

METHOD AND SYSTEM FOR ANALYZING AND PREDICTING VEHICLE STAY BEHAVIOR BASED ON MULTI-TASK LEARNING

CROSS-REFERENCE TO RELATED APPLICATIONS

The present application is a continuation of International Application No. PCT/CN2023/089134, filed on Apr. 19, 2023, the content of which is incorporated herein by reference in their entirety.

TECHNICAL FIELD

The present application mainly relates to the fields of trajectory data mining and intelligent transportation optimization, in particular to a method and a system for analyzing and predicting a vehicle stay behavior based on multi-task learning.

BACKGROUND

The analysis of vehicle stay behaviors refers to the statistics and analysis of the relevant data, from which the laws of users' travel intentions and activity attributes are found under the condition of obtaining the stay behavior data of the vehicle. These laws are combined with strategies such as traffic operation optimization of urban road network, which plays a key role in recommending points of interest, preventing road safety incidents, personalized recommending routes, planning urban roads and improving traffic efficiency.

In recent years, how to analyze and mine the depth characteristics of traffic big data, as well as how to model and predict the depth characteristics, has gradually become a hot spot in the field of urban computing, and has attracted the attention of many domestic and foreign experts and companies. The existing work mainly explores the internal temporal and spatial correlation of a single prediction task, such as traffic flow, speed, travel time and the like and introduces deep learning methods to model and predict traffic data. These works all ignore the temporal-spatial correlation and task dependence between different prediction tasks, but only predict a single task, which loses the task dependence between tasks, such as the stay location and the stay duration of vehicles. If the dependence between multiple tasks can be captured to better model traffic data, the accuracy of prediction will be greatly improved. Therefore, it is necessary to introduce multi-task learning into the analysis and prediction system of vehicle stay behaviors.

SUMMARY

In view of the shortcomings of the prior art, the present application provides a method and a system for analyzing and predicting a vehicle stay behavior based on multi-task learning.

In order to achieve the technical object, the technical solution of the present application is as follows.

According to a first aspect of the embodiment of the present application, a method for analyzing and predicting a vehicle stay behavior based on multi-task learning is provided, which includes the following steps:

S1, acquiring vehicle GPS and OBD data including a vehicle ID, a travel start time, a start longitude, a start latitude, an end time, an end longitude, and an end latitude after desensitization of a vehicle.

S2, preprocessing the vehicle GPS and OBD data to obtain vehicle stay behavior data including stay locations and stay durations; then, extracting a spatial-temporal characteristic of the preprocessed vehicle stay behavior data by a deep recurrent neural network.

In some embodiments, the step of extracting a spatial-temporal characteristic of the preprocessed vehicle stay behavior data by a deep recurrent neural network includes the following steps:

Dividing the vehicle stay behavior data into several levels of vehicle stay behavior data by a time interval.

Processing a certain level of vehicle stay behavior data by a first-level recurrent neural network.

Processing the vehicle stay behavior data between levels by a second-level recurrent neural network.

Transforming the vehicle stay behavior data between the first-level recurrent neural network and the second-level recurrent neural network to achieve the coding of the vehicle stay behavior data and obtain the spatial-temporal characteristics.

S3, inputting the spatial-temporal characteristics into a multi-task learning and predicting network, and obtaining a correlation between a stay location prediction task and a stay duration prediction task through the multi-task learning and predicting network based on historical stay behaviors of the vehicle, so as to predict the stay locations and the stay durations.

According to a second aspect of the embodiment of the present application, a system for analyzing and predicting a vehicle stay behavior based on multi-task learning is provided, including:

A data acquisition module for vehicle GPS and OBD data including vehicle ID, travel start time, start longitude, start latitude, end time, end longitude and end latitude after desensitization of a vehicle.

A vehicle stay behavior data acquisition module for preprocessing the vehicle GPS and OBD data to obtain vehicle stay behavior data including stay locations and stay durations; and extracting spatial-temporal characteristics of the preprocessed vehicle stay behavior by a deep recurrent neural network.

In some embodiments, extracting spatial-temporal characteristics of the preprocessed vehicle stay behavior by a deep recurrent neural network includes the following steps:

Dividing the vehicle stay behavior data into several levels of vehicle stay behavior data according to time intervals.

Processing a certain level of vehicle stay behavior data by a first-level recurrent neural network.

Processing the vehicle stay behavior data between levels by a second-level recurrent neural network.

Transforming the vehicle stay behavior data between the first-level recurrent neural network and the second-level recurrent neural network to realize the coding of the vehicle stay behavior data and obtain the spatial-temporal characteristics.

A multi-task learning and predicting module for inputting the spatial-temporal characteristics into a multi-task learning and predicting network, and obtaining a correlation between a stay location prediction task and a stay duration prediction task through the multi-task learning and predicting network based on historical stay behaviors of the vehicle, so as to predict the stay locations and the stay durations.

According to a third aspect of the embodiment of the present application, an electronic device is provided, including a memory and a processor, where the memory is coupled with the processor; in some embodiments, the memory is configured for storing program data, and the processor is configured for executing the program data to implement the above method for analyzing and predicting a vehicle stay behavior based on multi-task learning.

According to a fourth aspect of the embodiment of the present application, provided is a computer-readable storage medium, on which a computer program is stored, in some embodiments, the program, when executed by a processor, implements the above method for analyzing and predicting a vehicle stay behavior based on multi-task learning.

Compared with the prior art, the present application has the beneficial effects that the present application provides a method for analyzing and predicting a vehicle stay behavior based on multi-task learning, the method of the present application not only considers the historical stay behaviors of vehicles, but also considers the correlation between the stay location prediction task and the stay duration prediction task. The present application inputs the spatial-temporal characteristics into a multi-task learning and predicting network, and based on the correlation between stay location prediction task and stay duration prediction task obtained through multi-task learning and predicting network based on the historical stay behavior of vehicles, stay locations and stay durations are predicted, and the time-space dependence of vehicle stay behaviors can be analyzed, thereby improving the accuracy of stay behavior prediction. The present application provides support for applications such as interest point recommendation, personalized travel formulation, targeted advertising, smart stay and the like.

DESCRIPTION OF EMBODIMENTS

Reference will now be made in detail to exemplary embodiments, examples of which are illustrated in the accompanying drawings. When the following description refers to the drawings, unless otherwise indicated, the same numbers in different drawings indicate the same or similar elements. The embodiments described in the following exemplary embodiments do not represent all embodiments consistent with the present application.

Next, the specific embodiments of the present application will be further described in detail with reference to the attached drawings. In the case of no conflict, the characteristics in the following embodiments and implementations can be combined with each other.

Figure 1:
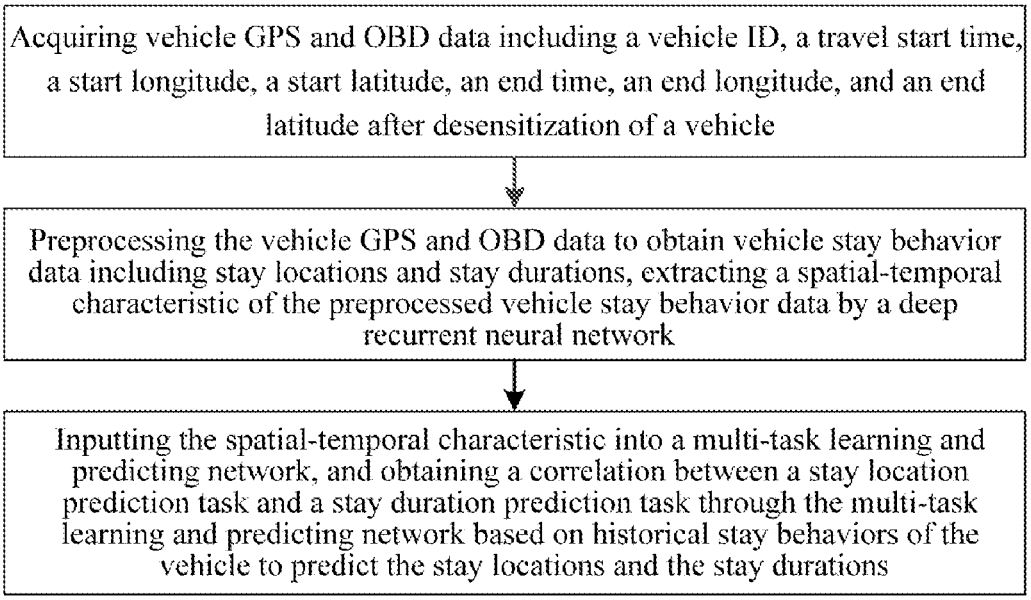
FIG. 1 is a flow chart of a method for analyzing and predicting a vehicle stay behavior based on multi-task learning proposed by an embodiment of the present application.
Figure 2:
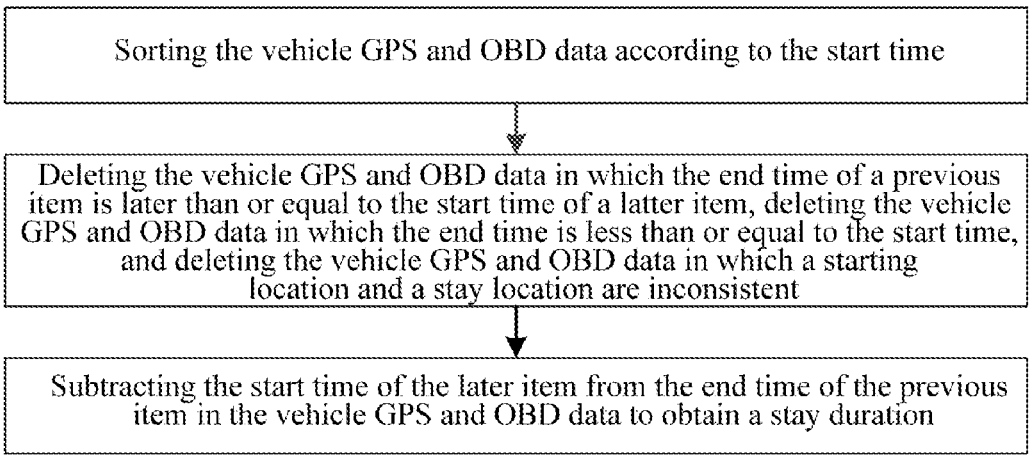
FIG. 2 is a flowchart of steps for extracting the stay duration provided by an embodiment of the present application.

As shown in FIG. 1, an embodiment of the present application also provides a method for analyzing and predicting a vehicle stay behavior based on multi-task learning, which includes the following steps:

S1, vehicle GPS (Global Positioning System) and OBD (On-Board Diagnostics) data are acquired, including vehicle ID, travel start time, start longitude, start latitude, end time, end longitude and end latitude after desensitization of a vehicle.

S2, the vehicle GPS and OBD data are preprocessed to obtain vehicle stay behavior data including stay locations and stay durations; and, spatial-temporal characteristics of the preprocessed vehicle stay behavior are extracted by a deep recurrent neural network.

Further, the step S2 specifically includes the following steps:

S2011, the vehicle GPS and OBD data are sorted according to the start time.

S2012, the vehicle GPS and OBD data in which the end time of a previous item is later than or equal to the start time of a latter item are deleted, and the vehicle GPS and OBD data in which the end time is less than or equal to the start time are deleted.

S2013, the start time of the last item is subtracted from the end time of the previous item in the vehicle GPS and OBD data, that is, the stay duration; in addition, it is necessary to eliminate the GPS and OBD data of vehicles in which a start location and a stay location are inconsistent, and the GPS and OBD data of vehicles in which stay duration is less than the threshold of stay duration are deleted; in this example, the threshold stay duration is set to 5 minutes.

Figure 3:
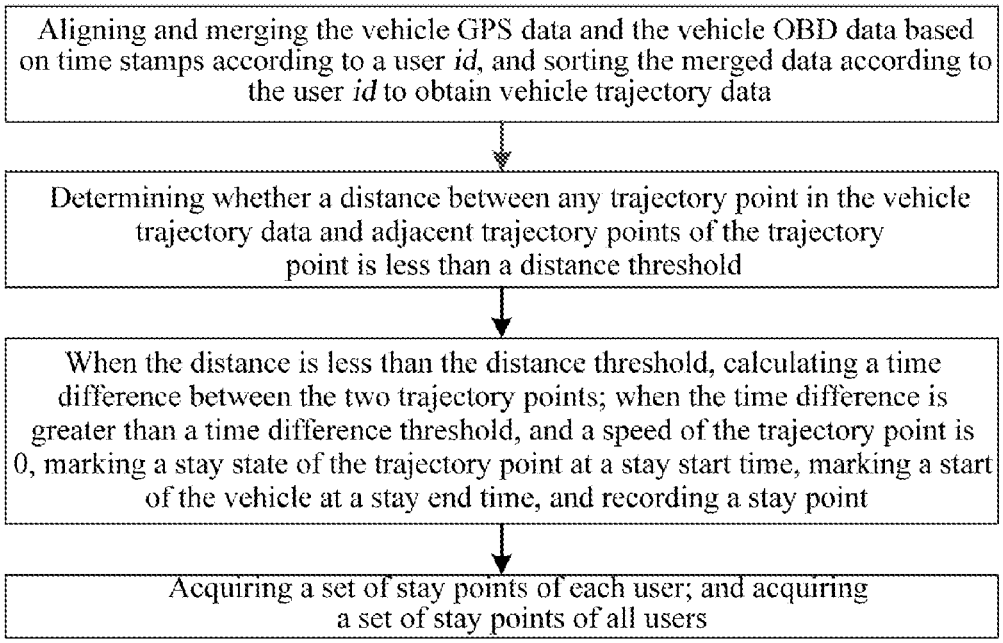
FIG. 3 is a flowchart of the steps for extracting the stay location provided by the embodiment of the present application.

As shown in FIG. 3, the specific extraction steps for obtaining the stay location are as follows:

S2014, the vehicle GPS data and OBD data are aligned and merged based on time stamps according to the user id, and sorting according to the user id to obtain vehicle trajectory data T.

S2015, it is determined whether a distance between any trajectory point in the vehicle trajectory data and adjacent trajectory points thereof is less than a distance threshold; in this example, the distance threshold is set to 50 m.

If the distance is less than the distance threshold, the time difference between the two trajectory points are calculated and recorded as $\tau$; if the time difference is greater than the time difference threshold (in this example, the time difference threshold is set to 150 s), and the speed of the trajectory point is 0, the stay state of the trajectory point is marked at the stay start time, a start of the vehicle is marked at the stay end time, and the $i^{th}$ stay point is recorded as $s_i$=(id, lon, lat, $t_s$, $t_e$, $\tau$), where id represents the user id, lon represents the stay point longitude, lat represents the stay point latitude, $t_s$ represents the stay start time, and $t_e$ represents the stay end time.

A set of stay points of each user is obtained, and the set of stay points of the jth user is recorded as $S_j=\{s_1, s_2, \ldots, s_n\}$, j=1, ..., n.

A set of stay points of all users is obtained, and recorded as $S=\{S_1, S_2, \ldots, S_n\}$.

In step S202, a deep recurrent neural network is used to extract the spatial-temporal characteristics of the preprocessed vehicle stay behavior.

Figure 4:
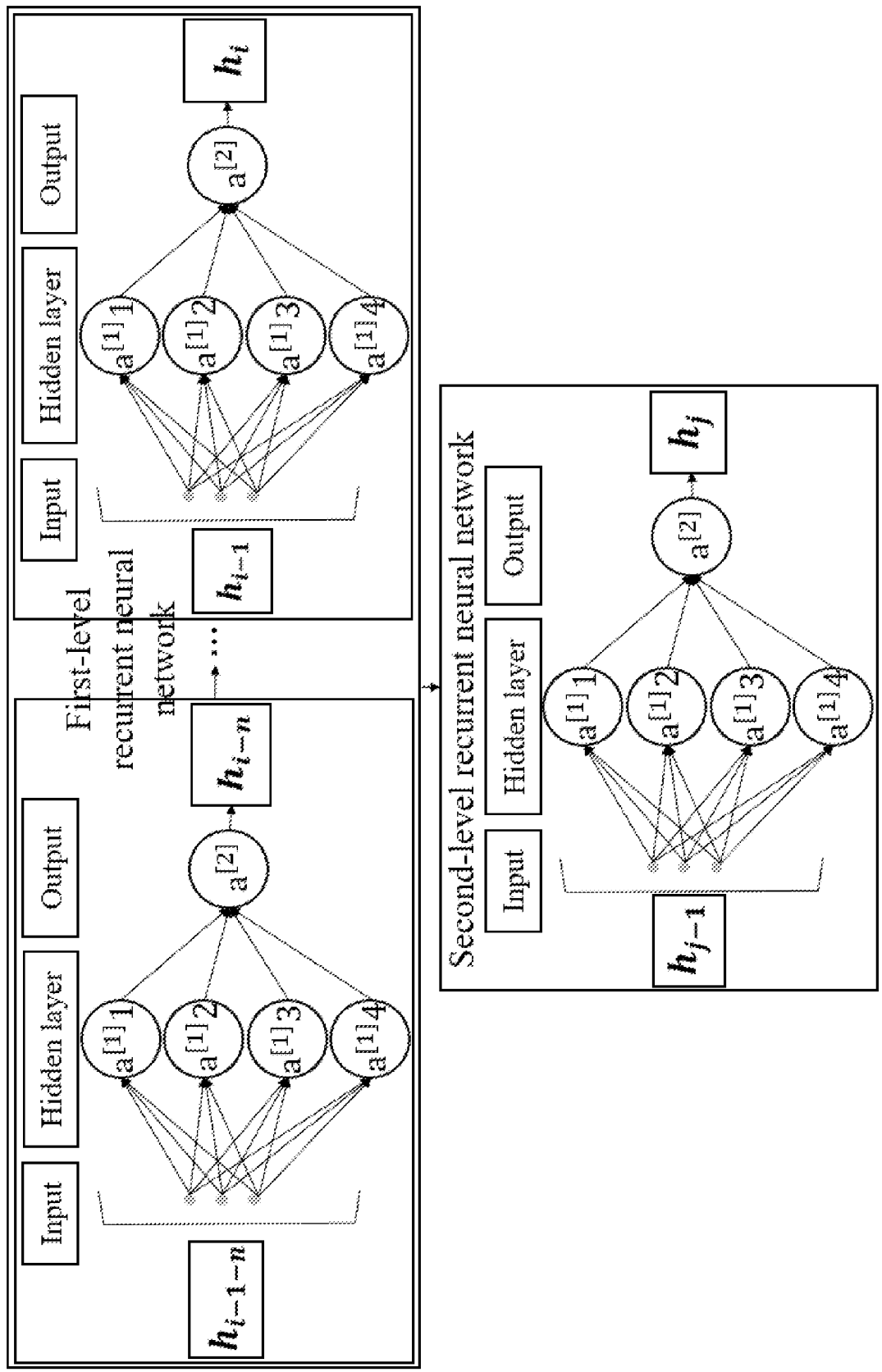
FIG. 4 is a schematic diagram of a deep recurrent neural network provided by an embodiment of the present application.

It is assumed that the stay behavior data of a vehicle users is $S=\{s_1, s_2, \ldots, s_n\}$, where each stay point $s_i$ represents a tuple consisting of latitude, longitude and time, namely $s_i=$(id, el, et, y, m, h, min, s, d), respectively indicating user id, stay longitude, stay latitude, year, month and day. As shown in FIG. 4, the deep recurrent neural network can extract the information of position and time through an embedded layer, and propagate this information in the first-level recurrent neural network to obtain the hidden state of the stay behavior. On the other hand, in the second-level recurrent neural network, the input comes from the output of the first-level recurrent neural network, and the vehicle stay behavior data is transformed between the first-level recurrent neural network and the second-level recurrent neural network, which can well represent the user's stay behavior, specifically including:

Dividing the user's stay behavior into different levels of moving trajectories according to the time interval from day to week, and performing transformation coding between the first-level recurrent neural network and the second-level recurrent neural network.

The process of processing the vehicle stay behavior data of a certain level by the first-level recurrent neural network is specifically as follows:

$$hi=RNN\_low(el \oplus et, hi-1) \quad \text{Equation (1)}$$

where $\oplus$ means splicing vectors, and $h_{i-1}$ represents a running state representation of the first-level recurrent neural network in a $i-1^{th}$ iteration; if the movements within a time interval less than a certain size are recorded, and this information of the user is iteratively input, then the representation of the user's movement records in a period of time can be obtained.

The process of processing the vehicle stay behavior data between levels by the second-level recurrent neural network is specifically as follows:

When the next user's movement record is large, it is necessary to input the low-level state into the high-level recurrent neural network to represent the user's movement record together; the specific details of the formula are as follows:

$$hj=RNN\_high(eu \oplus hn, hj-1) \quad \text{Equation (2)}$$

where eu represents vector information that uniquely identifies the user id, hn represents hidden state information sent after low-level RNN iteration representation, and hj−1 represents the last running result of a high-level recurrent neural network.

By coding different levels of stay behaviors with different levels of recurrent neural networks, the moving characteristics of the first level of stay behaviors can be extracted and processed in the second level of recurrent neural networks, so as to retain the characteristics of users' stay behaviors to the maximum extent.

The user's stay behavior is divided into different levels, namely the first level and the second level. By coding different stay behaviors, the user's stay behavior records are processed as a whole, thus simplifying the complicated stay behavior patterns of users. El and et are the latitude and longitude of the user's stay behavior place, and the first layer of the $i^{th}$ layer is embedded as follows:

$$h_i=RNN\_low(el \oplus et, h_{i-1}) \quad (1)$$

where $\oplus$ represents the splicing of vectors, $h_{i-1}$ represents the running state of the last recurrent neural network, and when i=1, it is the initially input stay behavior $s_i$. By inputting this information of users iteratively, the representation of users' stay behavior in a period of time can be obtained.

The second layer embedding inputs the first-level state of the user's stay behavior in a period of time into the high-level recurrent neural network, and integratedly represents the stay behaviors of the user:

$$h_j=RNN\_high(eu \oplus h_n, h_{j-1}) \quad (2)$$

where eu represents vector information that uniquely identifies the user id, hn represents hidden state information sent after the iteration representation of the first-level recurrent neural network, and $h_{j-1}$ represents a last running result of the second-level recurrent neural network.

Now that it is known how to use the hierarchical recurrent neural network to deal with the user's stay behavior, it can be intuitively understood that the user's stay behavior is segmented records. In the first-level recurrent neural network, only a segment of stay behaviors record is processed, and there is usually a long time interval between different stay behavior records. The second-level recurrent neural network is to deal with the situation between different stay behaviors. By transforming the user's stay behavior between two different levels, it can handle a longer record of user's stay behavior. This method of using a hierarchical structure can better retain the information of different levels of users' stay behaviors, so as to better model users' stay behaviors.

S3, the spatial-temporal characteristics are input into the multi-task learning and predicting network, and the correlation between the stay location prediction task and the stay duration prediction task is obtained through the multi-task learning and predicting network based on the historical stay behaviors of the vehicle, so as to predict the stay location and the stay duration.

The spatial-temporal characteristics are input into the multi-task learning and predicting network, a stay location task model and a stay duration task model are constructed based on the historical stay behaviors and a long short-term memory network according to the historical stay behaviors of the vehicle, and by allowing the stay location task model and the stay duration task model to learn at the same time through the multi-task learning and predicting network, the correlation between the stay location prediction task and the stay duration prediction task is mined to predict the stay locations and stay durations in a future time period.

In this example, both the stay location task model and the stay length task model are realized based on long short-term memory networks. The difference between the stay location task model and the stay length task model is that predicting the stay duration length is a regression problem, while predicting the stay location is a classification problem.

When predicting the stay duration task, the present application sorts the stay behavior data according to the time sequence to obtain the time sequence data of the vehicle stay behavior. Then, the next vehicle stay duration and location category are used as labels for training to obtain the information of the next vehicle stay duration and location category. Then, in the learning process of long short-term memory network tasks, the parameters change as follows:

$$\sigma(x)=1/(1+e^{-x}) \quad (3)$$

where $\sigma(x)$ represents a sigmoid activation function.

In the process of parameter learning, the stay duration task model not only uses the input x of the previous layer, but also uses the input h of the previous time point in this layer, as well as various gated inputs to form a new vector. This ensures that the stay duration task model can remember the previous stay behaviors of the vehicle, so as to predict the next stay behavior.

$$i_t = \sigma(W_{xi}x_t + W_{hi}h_{t-1} + b_i)$$

$$f_t = \alpha(W_{xf}x_t + W_{hf}h_{t-1} + b_f)$$

$$o_t = \sigma(W_{xo}x_t + W_{ho}h_{t-1} + b_o)$$

$$g_t = \tan h(W_{xc}x_t + W_{hc}h_{t-1} + b_o)$$

$$C_t = f_t \odot C_{t-1} + i_t \odot g_t$$

$$h_t = o_t \odot \tan h(C_t) \tag{4}$$

where $i_t$ is an input gate, $f_t$ is a forgetting gate, $o_t$ is an output gate, $g_t$ is a candidate internal state, $C_t$ is sa state unit, Wxi, Whi, Wxf, Whf, Wxo, Who, Wxc and Whcc represent the weights of the linear transformation matrix.

The stay duration task model uses a relu function to activate the task of predicting stay durations, because predicting stay duration is a regression problem, and the relu activation function generally has better performance. The relu activation function is a function that takes the maximum value and it will output a value greater than 0, that is, neurons will be activated when it is greater than 0. The output of values less than 0 will be suppressed, and 0 will be output when the input is negative. This can enable the stay duration task model to discard some values to make them become sparse, which has better prediction effect.

When predicting the stay locations, because this is a classification problem, the classification label is the location category obtained by clustering the vehicle trajectory points in the vehicle trajectory data through a clustering algorithm, therefore the stay location model adopts a softmax activation function. The formula of the softmax activation function is shown below, which is usually used in multi-classification problems. Softmax maps the value of each label to the (0, 1) interval, and the values of these labels add up to 1, and the value of the label represents the probability, and the label with the highest probability is the predicted result.

$$\text{Softmax}_i = \frac{e^i}{\sum_j e^j} \tag{5}$$

When predicting the stay duration, the loss function used in the predicted stay duration model is a Mean squared error (MSE), and the MSE is the square of the difference between the real value and the predicted value, which is then summed and averaged. The formula is as follows:

$$MSE = \frac{1}{m}\sum_{i=1}^{m}(y_i - \overline{yi})^2 \tag{6}$$

When predicting the stay location, the loss function used in the prediction stay location model is a cross entropy. In general, a cross entropy is usually used to describe the difference of probability values. When the two probability distributions are close, the value of the cross entropy is generally smaller. The calculation method is as follows:

$$C = -\frac{1}{n}\sum_x [y \ln a + (1-y)\ln(1-a)] \tag{7}$$

In the present application, the loss function of the multi-task deep learning model is the result obtained by adding the formulas (6) and (7). By optimizing these two loss functions at the same time, the multi-task deep learning model can learn the stay location prediction task and the stay length prediction task at the same time, and predict the stay behavior in the future time period.

Figure 5:
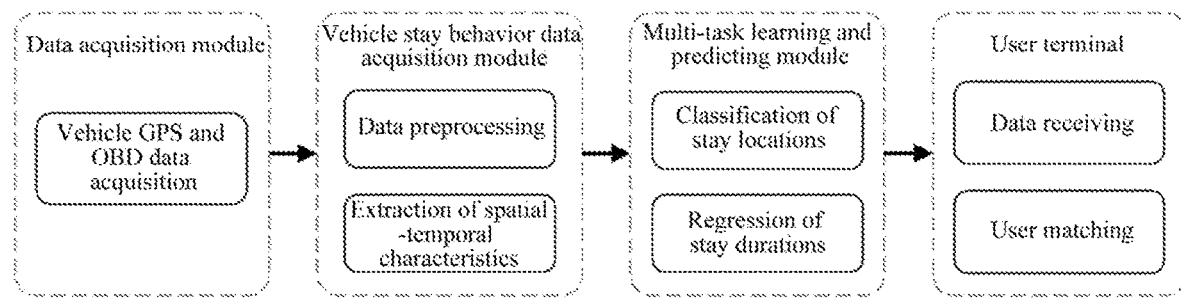
FIG. 5 is a schematic diagram of a vehicle stay behavior analysis and prediction system based on multi-task learning provided by an embodiment of the present application.

As shown in FIG. 5, the present application also provides a system for analyzing and predicting a vehicle stay behavior based on multi-task learning, including a data acquisition terminal, a stay behavior modeling terminal, a multi-task prediction terminal and a user terminal.

The data acquisition terminal includes a vehicle GPS and OBD data acquisition module and a data transmission module. The vehicle GPS (Global Positioning System) and OBD (On-Board Diagnostics) data acquisition modules mainly collect vehicle trajectory data combined by GPS and OBD, and transmit the collected trajectory data to the data transmission module; the data transmission module transmits the collected vehicle trajectory data to the data preprocessing module in the stay behavior modeling terminal. The data collected by the vehicle GPS and OBD data acquisition module includes vehicle ID, travel start time, start longitude, start latitude, end time, end longitude and end latitude and the like after vehicle desensitization. The vehicle GPS and OBD data are collectively referred to as vehicle trajectory data and transmitted to the data preprocessing module.

The stay behavior modeling terminal includes a data preprocessing module and a stay behavior modeling module; the data preprocessing module firstly receives the vehicle trajectory data transmitted by the data transmission module, and then extracts the vehicle stay behavior data from the vehicle trajectory data, specifically including the stay location and the stay duration; the stay behavior module uses a deep recurrent neural network method to extract the spatial-temporal characteristics of the preprocessed vehicle stay behavior, which lays the foundation for the multi-task prediction terminal. The data preprocessing module receives vehicle trajectory data and performs data preprocessing to obtain vehicle stay behavior data, specifically including vehicle ID, stay start time, stay longitude, stay latitude and stay end time after vehicle desensitization.

The multi-task prediction terminal includes a stay location classification module and a stay duration regression module. The terminal captures the correlation between multiple tasks based on multi-task learning and predicts the tasks, and predicts the stay behaviors in the future time period based on the historical stay behaviors of the vehicle and the correlation between multiple tasks.

The user terminal includes a prediction result receiving module and a user matching module. The prediction result receiving module receives the vehicle stay behavior prediction result output by the multi-task prediction terminal and transmits it to the user matching module. The user matching module matches the obtained stay behavior prediction result with individual users, and outputs the matching result to individual users.

The original data are shown in Table 1 below, and the prediction results are shown in Table 2 below.

TABLE 1

Original Data Sheet

| eLon | eLat | sub_class | e_year | e_mon | e_weekday | e_hour | during_time |
|---|---|---|---|---|---|---|---|
| 108.3646 | 22.82886 | 12 | 2017 | 6 | 0 | 8 | 5 |

The original data is as above. This data indicates that the vehicle stayed at a location with latitude and longitude of (108.3646, 22.82886). The location category of this location is 12, and the time is 8:00 am on Monday, June 2017, and it stayed at this location for 5 minutes.

TABLE 2

Prediction Results

| eLon | eLat | sub_class | e_year | e_mon | e_weekday | e_hour | during_time |
|---|---|---|---|---|---|---|---|
| 108.3646 | 22.82886 | 12 | 2017 | 6 | 0 | 8 | 5.581135 |

As can be seen from the data in Table 2, there is a certain error in the prediction result, but within an acceptable range, the last item represents the stay duration, the original data is 5, and the predicted result is 5.58. It is observed that the third item sub_class represents the location label, and the predicted location classification label is 12, which means that this location belongs to a certain point near the location 12, and the predicted result is also the location 12, which is basically accurate.

Figure 6:
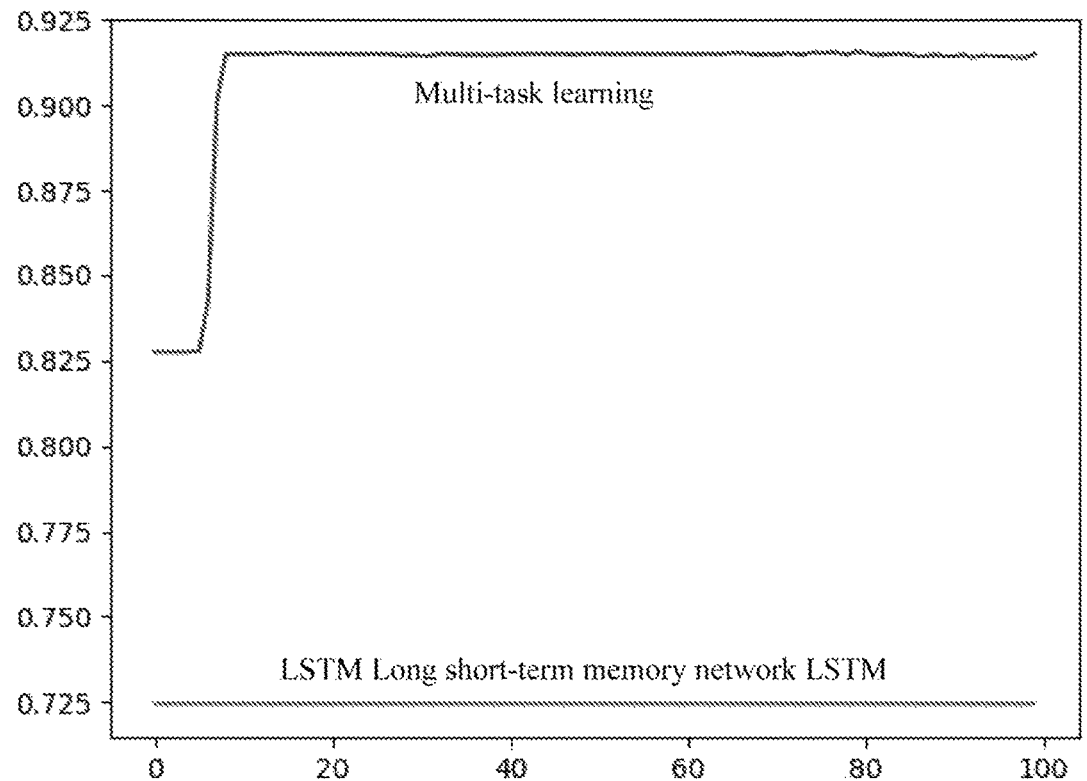
FIG. 6 is a comparison diagram of the accuracies of the multi-task prediction network and the LSTM network provided by the embodiment of the present application.

After training the multi-task learning and predicting network for 100 times, the correct result of the multi-task learning and predicting network is shown in FIG. 6. It can be seen that the correct rate of the multi-task learning and predicting network tends to remain unchanged after a small amount of training, and this is because the data of the multi-task learning and predicting network is too small. Since the multi-task learning and predicting network can only model for each vehicle user, it can only use the data of a private car. Then, according to FIG. 6, it can be seen that the correct rate of the multi-task deep learning model quickly reached over 90%, which is due to the fact that the multi-task deep learning neural network is deeper and fits the data better.

To sum up, the method of the present application not only considers the historical stay behaviors of the vehicle, but also considers the correlation between the stay location prediction task and the stay duration prediction task. The present application inputs the spatial-temporal characteristics into the multi-task learning and predicting network, and obtains the correlation between the stay location prediction task and the stay duration prediction task through the multi-task learning and predicting network based on the historical stay behaviors of the vehicle, so as to predict the stay location and the stay duration, analyze the spatio-temporal dependence of the vehicle stay behaviors, and improve the accuracy of the stay behavior prediction. The present application provides support for applications such as interest point recommendation, personalized travel formulation, targeted advertising, smart stay and the like.

Corresponding to the embodiment of the method for analyzing and predicting a vehicle stay behavior based on multi-task learning, the present application also provides an embodiment of a device for analyzing and predicting a vehicle stay behavior based on multi-task learning.

Figure 7:
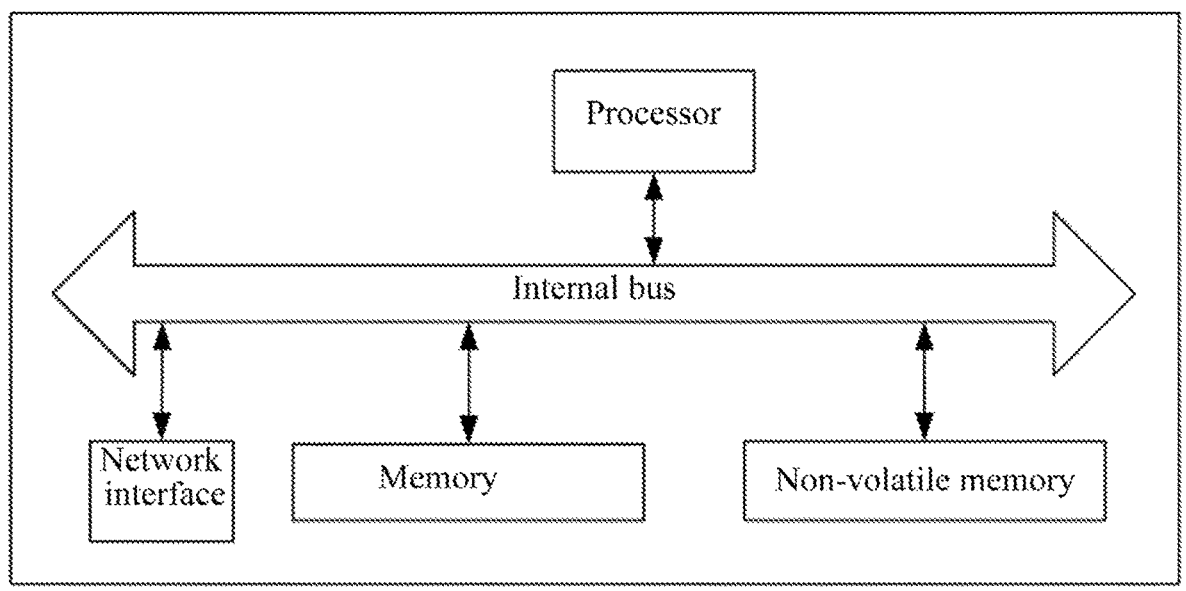
FIG. 7 is a schematic diagram of an electronic device provided by an embodiment of the present application.

Referring to FIG. 7, a device for analyzing and predicting a vehicle stay behavior based on multi-task learning provided by an embodiment of the present application includes one or more processors for implementing the method for analyzing and predicting a vehicle stay behavior based on multi-task learning in the above embodiment.

The embodiment of the device for analyzing and predicting a vehicle stay behavior based on multi-task learning of the present application can be applied to any equipment with data processing capability, which can be devices or apparatuses such as computers. The embodiment of the device can be realized by software, or by hardware or a combination of hardware and software. Taking software implementation as an example, as a logical device, it is formed by reading the corresponding computer program instructions in the non-volatile memory into the memory through the processor of any equipment with data processing capability. From the hardware level, as shown in FIG. 7, it is a hardware structure diagram of any equipment with data processing capability where the vehicle stay behavior analysis and prediction device based on multi-task learning of the present application is located. In addition to the processor, memory, network interface and non-volatile memory shown in FIG. 7, any equipment with data processing capability where the device is located in the embodiment usually includes other hardware according to the actual function of the equipment with data processing capability, which will not be described here again.

The implementing process of the functions and functions of each unit in the above-mentioned device is detailed in the implementing process of the corresponding steps in the above-mentioned method, and will not be repeated here.

For the device embodiment, since it basically corresponds to the method embodiment, it is only necessary to refer to part of the description of the method embodiment for the relevant points. The device embodiments described above are only schematic, in which the units described as separate components may or may not be physically separated, and the components displayed as units may or may not be physical units, that is, they may be located in one place or distributed to multiple network units. Some or all of the modules can be selected according to actual needs to achieve the purpose of the solution of the present application. Those skilled in the art can understand and implement the present application without creative labor.

The embodiment of the present application also provides a computer-readable storage medium, on which a program is stored, which, when executed by a processor, implements the method for analyzing and predicting a vehicle stay behavior based on multi-task learning in the above embodiment.

The computer-readable storage medium can be an internal storage unit of any device with data processing capability as described in any of the previous embodiments, such as a hard disk or a memory. The computer-readable storage medium can also be any device with data processing capability, such as a plug-in hard disk, a Smart Media Card (SMC), an SD card, a Flash Card and the like. Further, the computer-readable storage medium can also include both internal storage units and external storage devices of any device with data processing capability. The computer-readable storage medium is used for storing the computer program and other programs and data required by any equipment with data processing capability, and can also be used for temporarily storing data that has been output or will be output.

The above embodiments are only used to illustrate the design ideas and characteristics of the present application, and their purpose is to enable those skilled in the art to understand the contents of the present application and implement it accordingly. The protection scope of the present application is not limited to the above embodiments. Therefore, all equivalent changes or modifications made according to the principles and design ideas disclosed in the present application shall fall within the protection scope of the present application.

What is claimed is:

1. A method for analyzing and predicting a vehicle stay behavior based on multi-task learning, comprising:
   S1, acquiring vehicle Global Positioning System (GPS) data and vehicle On-Board Diagnostics (OBD) data comprising a vehicle ID, a travel start time, a start longitude, a start latitude, an end time, an end longitude and, an end latitude after desensitization of a vehicle;
   S2, preprocessing the vehicle GPS data and the vehicle OBD data to obtain vehicle stay behavior data comprising stay locations and stay durations, and extracting a spatial-temporal characteristic of the preprocessed vehicle stay behavior data by a deep recurrent neural network;
   S3, inputting the spatial-temporal characteristic into a multi-task learning and predicting network, and obtaining a correlation between a stay location prediction task and a stay duration prediction task through the multi-task learning and predicting network based on historical stay behaviors of the vehicle to predict the stay locations and the stay durations;
   wherein the step of obtaining a correlation between a stay location prediction task and a stay duration prediction task through the multi-task learning and predicting network based on historical stay behaviors of the vehicle to predict the stay locations and the stay durations comprises:
   inputting the spatial-temporal characteristic into the multi-task learning and predicting network, construing a stay location task model and a stay duration task model based on the historical stay behaviors and a long short-term memory network, respectively, allowing the stay location task model and the stay duration task model to learn at the same time through the multi-task learning and predicting network, and mining the correlation between the stay location prediction task and the stay duration prediction task to predict the stay locations and the stay durations in a future time period;
   wherein a process of multi-task learning comprises: using a relu function as an activation function, using a mean square error function as a loss function for predicting the stay durations, and using a cross entropy function as a loss function for predicting the stay locations; the loss function of a multi-task deep learning network is a sum of the mean square error function and the cross entropy function; the mean square error function and the cross entropy function are optimized at the same time, and the stay locations and the stay durations in the future time period are obtained by learning and prediction.

* * * * *